(12) United States Patent
Stefanoff

(10) Patent No.: US 12,155,250 B1
(45) Date of Patent: Nov. 26, 2024

(54) HYBRID ENERGY STORAGE SYSTEMS AND METHODS

(71) Applicant: Buddy Stefanoff, Owasso, OK (US)

(72) Inventor: Buddy Stefanoff, Owasso, OK (US)

(*) Notice: Subject to any disclaimer, the term of this patent is extended or adjusted under 35 U.S.C. 154(b) by 118 days.

(21) Appl. No.: 16/883,456

(22) Filed: May 26, 2020

Related U.S. Application Data

(60) Provisional application No. 62/853,134, filed on May 27, 2019.

(51) Int. Cl.
*H02J 7/00* (2006.01)
*H02J 7/35* (2006.01)

(52) U.S. Cl.
CPC ............ *H02J 7/007* (2013.01); *H02J 7/0048* (2020.01); *H02J 7/35* (2013.01)

(58) Field of Classification Search
CPC ............ H02J 7/007; H02J 7/0048; H02J 7/35
USPC ...................................................... 307/43, 80
See application file for complete search history.

(56) References Cited

U.S. PATENT DOCUMENTS

| | | | |
|---|---|---|---|
| 2009/0033148 A1* | 2/2009 | Hoff | B60K 6/46 307/10.1 |
| 2011/0015815 A1* | 1/2011 | Bertness | G01R 31/007 701/22 |
| 2012/0119574 A1* | 5/2012 | Sone | B60L 50/40 307/10.1 |
| 2015/0226147 A1* | 8/2015 | Hirabayashi | F02D 41/403 701/102 |
| 2020/0247253 A1* | 8/2020 | Furukawa | B60L 53/14 |
| 2020/0259225 A1* | 8/2020 | Singer | H02J 7/007194 |
| 2020/0412132 A1* | 12/2020 | Kristjansson | H02J 7/0014 |

* cited by examiner

*Primary Examiner* — Michael R. Fin

(57) ABSTRACT

Hybrid energy storage systems and methods are disclosed herein. An example hybrid energy storage system can include initiating an electric field charging cycle to charge an electric field storage cell; determining that the electric field storage cell has been charged to at least a threshold state of charge (SoC); electrically coupling the electric field storage cell with any one or more of an electrochemical storage cell and a power source through a rapid charger element to charge the electrochemical storage cell; determining when the electrochemical storage cell has reached a threshold level SoC; connecting a converter to a load; and discharging the electrochemical storage cell to the load and monitoring the SoC of the electrochemical storage cell during use.

8 Claims, 4 Drawing Sheets

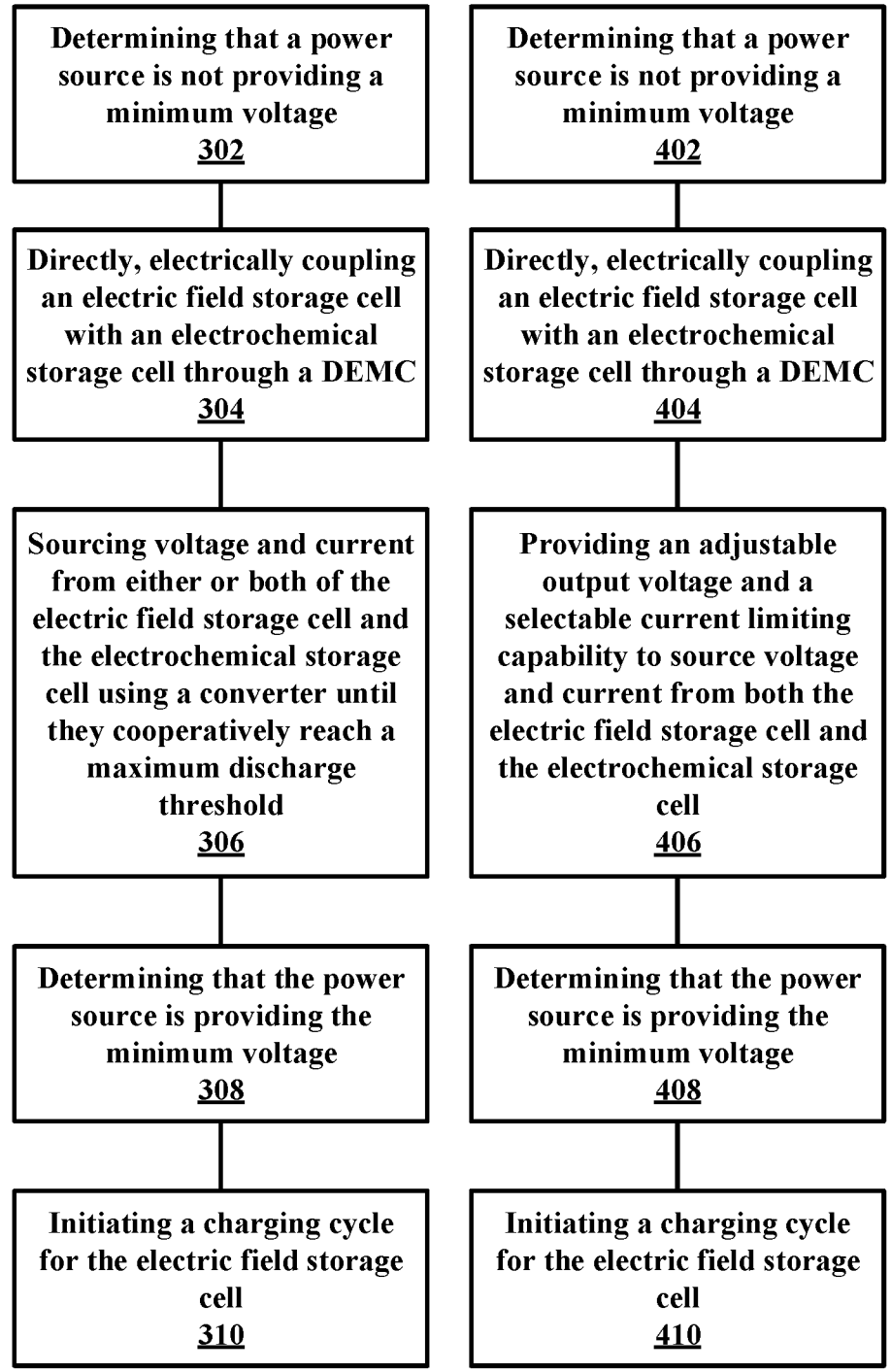

HYBRID ENERGY STORAGE SYSTEMS AND METHODS

CROSS-REFERENCE TO RELATED APPLICATION(S)

This non-provisional application claims the benefit and priority of U.S. provisional patent application Ser. No. 62/853,134, titled "HYBRID ENERGY STORAGE SYSTEMS AND METHODS", filed on May 27, 2019, which is hereby incorporated by reference herein in its entirety, including all references and appendices cited therein, for all purposes, as if fully set forth herein.

TECHNICAL FIELD

The present disclosure relates to energy storage, and more specifically, but not by way of limitation, to energy storage systems that comprise at least one electric field storage element and at least one electrochemical storage element, along with controller circuitry to manage current flow of these combined element types. Some embodiments include a means for charging the storage elements that can include a photovoltaic cell or other means for charging.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 is a flowchart of another example hybrid energy storage device control method.

FIG. 4 is a flowchart of yet another example hybrid energy storage device control method.

DETAILED DESCRIPTION

Overview

The present disclosure is directed, in some embodiments, to devices, systems, and methods for hybrid energy storage and use. Generally, the present disclosure describes new approaches to energy storage that utilize the advantages of two types of energy storage elements, such as electrochemical storage and electric field storage (e.g., such as supercapacitor technology). Integrating these two types of energy storage elements into a single system becomes problematic due to the disparate charge and discharge parameters of these two types of energy storage elements.

In some embodiments, specific embodiments disclosed herein can be used in combination with photovoltaic systems. Most stand-alone photovoltaic (PV) systems require an electrochemical battery to supply continuous energy to the load. Typically, these systems are designed around a specific voltage, such as 12 or 24 volts, and are dependent on storage and load demands. This design strategy limits the introduction of new technology, such as supercapacitors, which have specific charge and discharge characteristics that are unique and distinct when compared to electrochemical storage batteries. In addition, most attempts to combine electrochemical battery storage and supercapacitors have involved the direct interconnection of these technologies to either the photovoltaic panel(s) or the load. The present disclosure provides solutions to these problems.

Illustrative Embodiments

The present disclosure provides new approaches to solving the aforementioned problems. These new approaches utilize the advantages of both electrochemical storage and electric field storage. In various embodiments, a hybrid energy storage system is disclosed that incorporates a Digital Energy Management Controller (DEMC) that monitors and controls input and output load conditions. The hybrid energy storage device can comprise a 48 Volt Direct Current (DC) battery storage assembly that includes one or more electrochemical storage cells and a dedicated microcontroller. An example hybrid energy storage device may also comprise a 48 volt DC electric field storage assembly that includes one or more electric field storage cells and a dedicated microcontroller.

Figure 1:
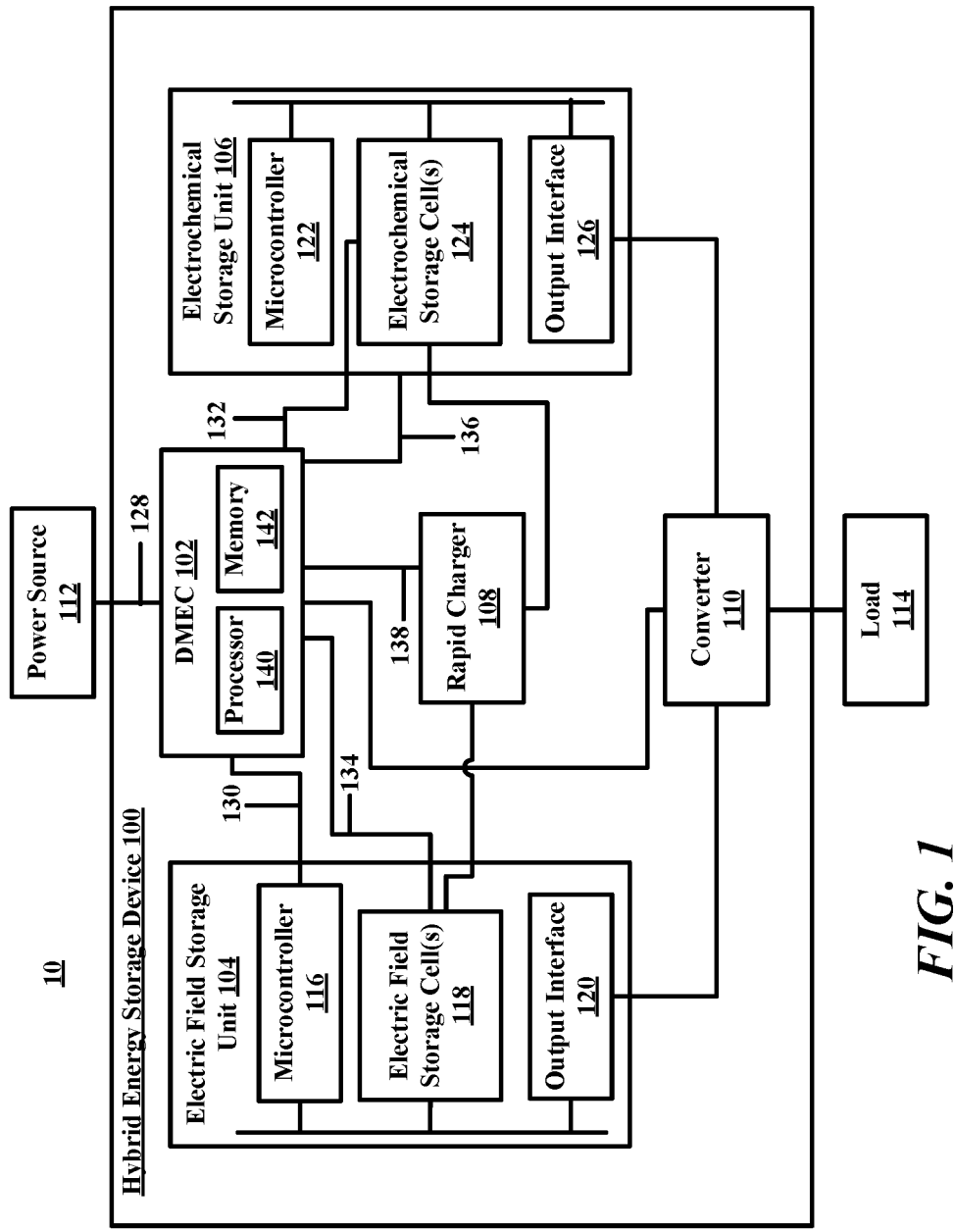
FIG. 1 depicts an illustrative architecture in which techniques and structures for providing the systems and methods disclosed herein may be implemented.

Turning now to the drawings, FIG. 1 depicts an illustrative architecture 10 in which techniques and structures of the present disclosure may be implemented. The illustrative architecture 10 may include a hybrid energy storage apparatus 100 that comprises a digital energy management controller (DEMC) 102, an electric field storage unit 104, an electrochemical storage unit 106, a rapid charger element 108, and a converter 110. A power source 112 can be used to charge the electric field storage unit 104 and the electrochemical storage unit 106. The hybrid energy storage apparatus 100 can be used to provide stored energy to a load 114.

In more detail, in some embodiments the electric field storage unit 104 may comprise a microcontroller 116, one or more electric field storage cell(s) 118, and an output interface 120. As noted above, the electric field storage unit 104 can function as a 48 volt DC (direct current) electric field storage assembly. The microcontroller 116 comprises a processor and memory for storing executable instructions. The microcontroller 116 can communicate with the DEMC 102 to receive instructions or signals that allow the microcontroller 116 to control elements of the electric field storage unit 104. For example, the microcontroller 116 can control utilization of the one or more electric field storage cell(s) 118 and the output interface 120.

Generally, the one or more electric field storage cell(s) 118 can comprise, for example, a capacitor, or a supercapacitor, or other similar electric field cell that would be known to one of ordinary skill in the art. A volume of electrical energy that can be stored in the one or more electric field storage cell(s) 118 can vary according to design requirements. For example, the volume can vary according to the needs of an application or a load. The form factor for the storage cells can vary according to design requirements.

According to some embodiments, the electrochemical storage unit 106 can comprise a microcontroller 122, one or more electrochemical storage cell(s) 124, and an output interface 126. As noted above, the electrochemical storage unit 106 can function as a 48 Volt DC battery storage assembly. The microcontroller 122 comprises a processor and memory for storing executable instructions. The microcontroller 122 can communicate with the DEMC 102 to receive instructions or signals that allow the microcontroller 122 to control elements of the electrochemical storage unit 106. For example, the microcontroller 122 can control utilization of the one or more electrochemical storage cell(s) 124 and the output interface 126.

Generally, the one or more electrochemical storage cell(s) 124 can comprise, for example, a lead-acid battery cell, a Lithium-ion battery cell, a Lithium-polymer battery cell, or any other electrochemical storage cell that would be known to one of ordinary skill in the art. In various embodiments, multiple different types of electrochemical storage cells could be utilized and configured in an array. The form factor for the storage cells can vary according to design requirements.

A volume of electrical energy that can be stored in the one or more electric field storage cell(s) 118 can vary according to design requirements. For example, the volume can vary according to the needs of the application or the load.

The power source 112 can comprise any desired power source such as a photovoltaic source, a wind power source, a turbine, or any other alternating current or direct current source that provides an input voltage. The DEMC 102 can comprise a processor and a memory for storing executable instructions. The processor can execute instructions stored in memory, such as hybrid energy storage logic to provide the control methods for use of the hybrid energy storage device 100.

The DEMC 102 can comprise inputs such as a first input 128, a second input 130, and a third input 132. The first input 128 can couple the DEMC 102 to the power source 112, while the second input 130 electrically couples with the electric field storage unit 104. In some embodiments, the microcontroller 116 is coupled with the DEMC 102. The power source 112 is coupled with the one or more electric field storage cell(s) 118 through the DEMC 102.

A third input 132 couples the electrochemical storage unit 106 with the DEMC 102. In some embodiments, the microcontroller 122 is coupled with the DEMC 102. The power source 112 is coupled with the one or more electrochemical storage cell(s) 124 through the DEMC 102. The DEMC 102 can also couple with the electric field storage cell(s) 118 through a fourth input 134, with the electrochemical storage unit 106 through a fifth input 136, and with the rapid charger 108 through a sixth input 138.

In some embodiments, the DEMC 102 can comprise a processor 140 and memory 142. The processor 140 executes instructions stored in memory to provide any of the methods disclosed herein for controlling the operations of the hybrid energy storage device 100 or individual components thereof.

According to some embodiments, the DEMC 102 can be configured to monitor conditions such as an input/source voltage and current provided by the power source 112, which is referred to generally as a baseload. The baseload could comprise, for example, utility power, portable generated power, renewable power such as solar and wind, and the like. The DEMC 102 can also monitor output/load demands of an applied load 114. In response, the DEMC 102 can control the use of the electric field storage unit 104 and the electrochemical storage unit 106 to provide constant voltage and constant current as needed to the load 114. The DEMC 102 can also determine a state of charge (SoC) for both the one or more electric field storage cell(s) 118 and the one or more electrochemical storage cell(s) 124 (in some embodiments through communication with the subordinate/slave microcontrollers 116/122).

In various embodiments, when the DEMC 102 determines the power source 112 is providing a minimum voltage, an electric field charging cycle can be initiated. For example, a minimum voltage, with respect to a 48 Volt system would be 40 volts plus 0.1% (one tenth of one percent), which in this instance would be 4.8 Volts. As electric field storage cells use voltage balancing to prevent damage caused by individual cell imbalance, the microcontroller 116 utilizes individual cell voltage monitoring and charging of the one or more electric field storage cell(s) 118 at a rate of 0.500 ms to prevent cell imbalance and monitor the one or more electric field storage cell(s) 118 and report the state of charge to the DEMC 102. Since the energy stored capability is a function of capacitance and voltage, and capacitance is either known or constant (relatively speaking). To be sure, an open-circuit voltage measurement can be utilized by the DEMC 102 to effectively determine the state of charge of the one or more electric field storage cell(s) 118.

The DEMC 102 can determine when the one or more electric field storage cell(s) 118 have charged sufficiently (can vary according to design requirements). This can include comparing the SoC of the one or more electric field storage cell(s) 118 to a threshold SoC. Once the actual SoC meets or exceeds the threshold SoC, the DEMC 102 can electrically couple or connect both the power source 112 and the one or more electric field storage cell(s) 118 to the one or more electrochemical storage cell(s) 124 via an onboard high current rapid charger 108. The one or more electric field storage cell(s) 118 provide an inrush current for the onboard high current rapid charger 108 and are not required once the one or more electrochemical storage cell(s) 124 have reached a threshold level of storage capacity for the one or more electrochemical storage cell(s) 124. In one example, the threshold level can include approximately 40% of a total storage capacity of the one or more electrochemical storage cell(s) 124.

Temperature monitoring and voltage balancing of the one or more electrochemical storage cell(s) 124 can be provided through use of the microcontroller 122 prevent individual cells from entering thermal runaway. Thus, the microcontroller 122 and circuit board assembly can be utilized to monitor the temperature, prevent thermal runaway, and report the state of charge of the one or more electrochemical storage cell(s) 124 to the DEMC 102.

Once the DEMC 102 determines that both the one or more electric field storage cell(s) 118 and the one or more electrochemical storage cell(s) 124 have been charged, the DEMC 102 connects an efficient 48 volt DC to 12 volt DC buck converter 110 to the load 114. In some embodiments, the converter 110 provides an adjustable output voltage of 9 to 48 VDC and selectable current limiting capability.

As the load 114 discharges (e.g., consumes) stored energy in the one or more electrochemical storage cell(s) 124, the DEMC 102 monitors the state of charge of the one or more electrochemical storage cell(s) 124 and connects the power source 112 and the one or more electric field storage cell(s) 118 to the rapid charger 108 when the state of charge of the one or more electrochemical storage cell(s) 124 drops below a threshold level (e.g., 80%).

As the one or more electric field storage cell(s) 118 is discharged into the one or more electrochemical storage cell(s) 124, the one or more electric field storage cell(s) 118 are turn connected to the power source 112 and charged. To be sure, this method of energy harvesting is particularly attractive when the power source 112 is solar based as these systems alone are generally not capable of providing the necessary inrush current required for rapid battery chargers.

When the power source 112 is no longer providing an input voltage, the DEMC 102 connects the one or more electric field storage cell(s) 118 directly to the one or more electrochemical storage cell(s) 124. The 48 volt DC to 12 volt DC converter 110 can continue to source voltage and current from both the one or more electric field storage cell(s) 118 and the one or more electrochemical storage cell(s) 124 until they cooperatively reach a maximum discharge threshold. In another embodiment, the converter 110 provides an adjustable output voltage of 9 to 48 VDC and selectable current limiting capability to source voltage and current from both the one or more electric field storage cell(s) 118 and the one or more electrochemical storage cell(s) 124 until they cooperatively reach a maximum discharge threshold. When the DEMC 102 determines the power source 112 is providing the minimum voltage, the charging cycle is initiated once again.

Devices, systems and methods disclosed herein provide advantages. For example, when comparing the physical size of a 12 or 24 volt DC system with a specific watt hour rating, a 48 volt DC battery with the exact specific watt hour rating will have a smaller and more compact form factor. The 48 volt DC to 12 volt DC converter efficiently harvests the energy reserve of both the electrochemical and supercapacitor batteries before reaching their voltage thresholds. These devices, systems and methods can be utilized for applications that require constant voltage or constant current, such as LED (light emitting diode) lighting. These devices, systems and methods are also scalable for both small and large scale applications. According to other embodiments, the apparatus 100 could be constructed without the use of the electrochemical storage unit 106, such that the apparatus 100 could include only electrical field storage elements.

Figure 2:
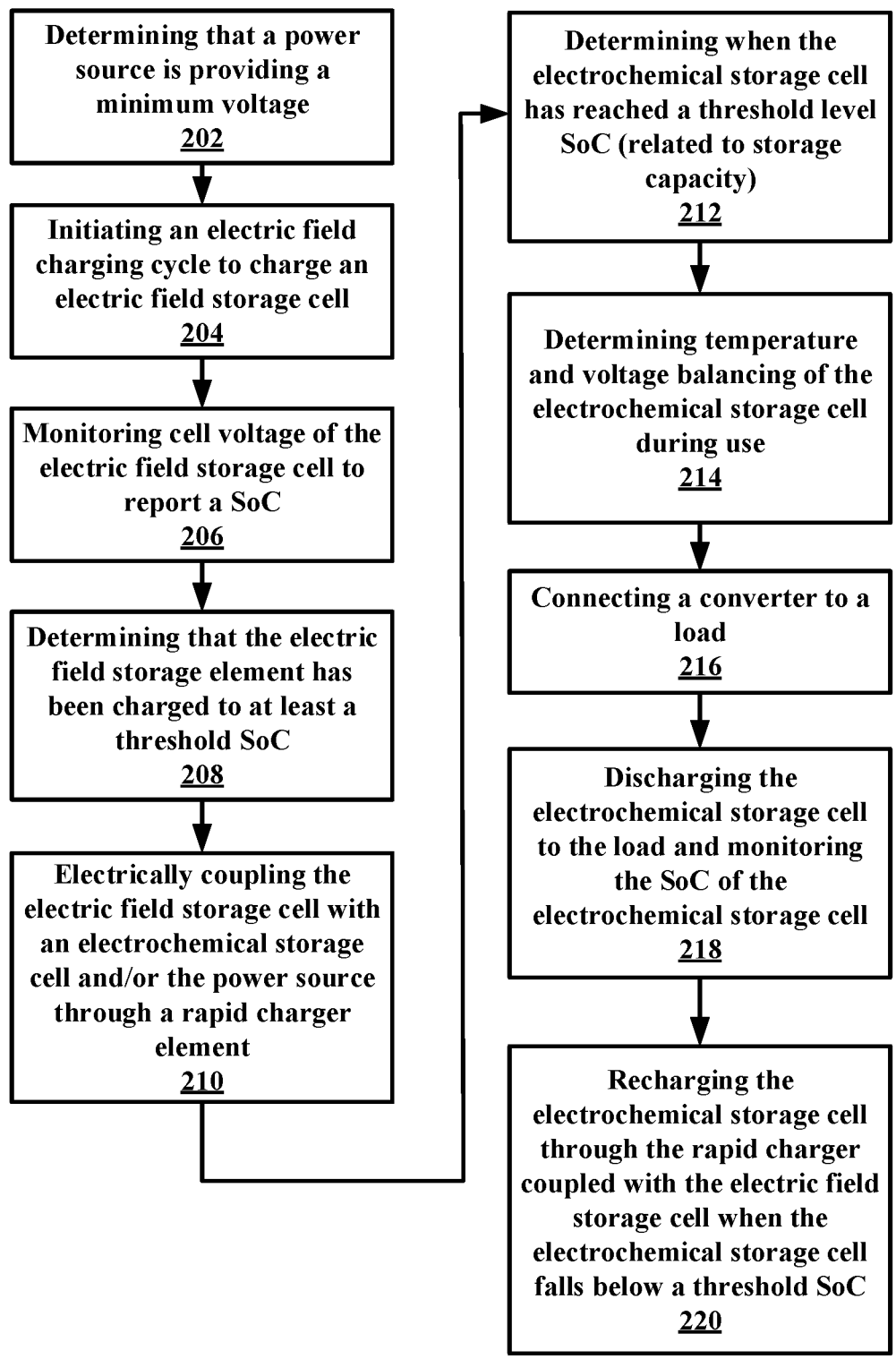
FIG. 2 is a flowchart of an example hybrid energy storage device control method.

FIG. 2 is a flowchart of an example method of the present disclosure. The method can be executed by a DEMC of the present disclosure. The method can include a step 202 of determining that a power source is providing a minimum voltage. Example minimum voltages are described supra. The method can include a step 204 of initiating an electric field charging cycle to charge an electric field storage cell, as well as a step 206 of monitoring cell voltage of the electric field storage cell to report a SoC. The method can include a step 208 of determining that the electric field storage element has been charged to at least a threshold SoC. Once the threshold SoC has been reached, the method can include a step 210 of electrically coupling the electric field storage cell with an electrochemical storage cell and/or the power source through a rapid charger element.

The method can include a step 212 of determining when the electrochemical storage cell has reached a threshold level SoC. To be sure, the threshold level SoC may be related to storage capacity in some embodiments. According to some embodiments, the method can include a step 214 of determining temperature and voltage balancing of the electrochemical storage cell during use.

In accordance with the present disclosure, the method can include a step 216 of connecting a converter to a load, as well as a step 218 of discharging the electrochemical storage cell to the load and monitoring the SoC of the electrochemical storage cell.

During use, when the electrochemical storage cell falls below a threshold SoC, the method can include a step 220 of recharging the electrochemical storage cell through the rapid charger coupled with the electric field storage cell. Essentially, the method returns to step 202 for recharging.

FIG. 3 is another method of the present disclosure. The method includes a step 302 of determining that a power source is not providing a minimum voltage. When the power source is not providing a minimum voltage, the method includes a step 304 of directly and electrically coupling the electric field storage cell with the electrochemical storage cell through a DEMC. Next, the method includes a step 306 of sourcing voltage and current from either or both of the electric field storage cell and the electrochemical storage cell using a converter until they cooperatively reach a maximum discharge threshold.

In some embodiments, the method includes a step 308 of determining that the power source is providing the minimum voltage. The method can then include a step 310 of initiating a charging cycle for the electric field storage cell.

FIG. 4 is yet another method of the present disclosure. The method includes a step 402 determining that a power source is not providing a minimum voltage. When the power source is not providing a minimum voltage, the method includes a step 404 of directly and electrically coupling the electric field storage cell with the electrochemical storage cell through a DEMC.

The method can include a step 406 of providing an adjustable output voltage and a selectable current limiting capability to source voltage and current from both the electric field storage cell and the electrochemical storage cell. In some embodiments, the method includes a step 408 of determining that the power source is providing the minimum voltage. The method can then include a step 410 of initiating a charging cycle for the electric field storage cell.

Figure 5:
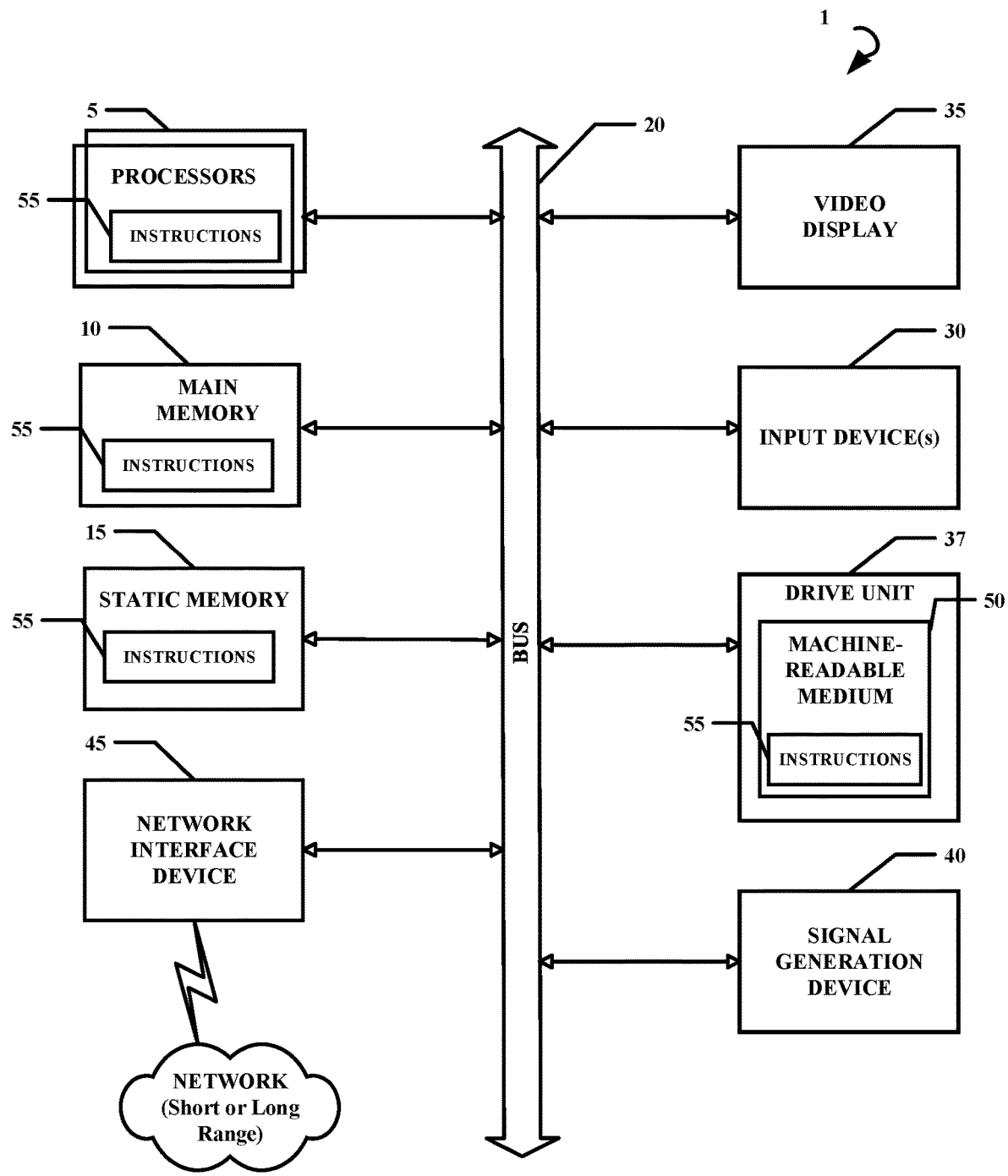
FIG. 5 is a schematic diagram of an example computer system that can be used to practice aspects of the present disclosure.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40

(e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

That which is claimed is:

1. A method for managing a hybrid energy storage system, the method comprising:
    initiating an electric field charging cycle by a digital energy management controller (DEMC) to charge an electric field storage cell until the cell reaches at least a threshold state of charge (SoC), wherein the DEMC executes instructions stored in a memory to dynamically adjust the charging based on real-time voltage and current measurements;
    upon reaching the threshold SoC, electrically coupling, via the DEMC, the charged electric field storage cell with an electrochemical storage cell through a rapid charger, wherein the DEMC controls the rapid charger to optimize a charge transferred to the electrochemical storage cell based on a predetermined SoC threshold;
    determining, by the DEMC, when the electrochemical storage cell has reached the predetermined threshold level SoC, wherein the determination is based on monitoring voltage and current inputs from both the electric field storage cell and the electrochemical storage cell;
    connecting, under control of the DEMC, a converter to a load, wherein the DEMC adjusts an output voltage and current of the converter to match load requirements of the load based on the monitored SoC of the electrochemical storage cell; and
    discharging the electrochemical storage cell to the load while continuously monitoring the SoC of the electrochemical storage cell by the DEMC to ensure a consistent energy supply to the load, wherein the DEMC further manages the energy flow from both the electric field storage cell and the electrochemical storage cell to the load to maintain the load operation within predefined energy parameters.

2. The method according to claim 1, further comprising recharging the electrochemical storage cell through the rapid charger coupled with the electric field storage cell when the electrochemical storage cell falls below the threshold SoC.

3. The method according to claim 1, further comprising determining temperature and voltage balancing of the electrochemical storage cell during use thereof.

4. The method according to claim 1, further comprising a power source providing a minimum voltage.

5. The method according to claim 4, further comprising determining that the power source is not providing the minimum voltage.

6. The method according to claim 5, further comprising sourcing voltage and current from either or both of the electric field storage cell and the electrochemical storage cell using a converter until the electric field storage cell and the electrochemical storage cell cooperatively reach a maximum discharge threshold.

7. The method according to claim 6, further comprising providing an adjustable output voltage and a selectable current limiting capability to source voltage and current from both the electric field storage cell and the electrochemical storage cell.

8. The method according to claim 7, further comprising:
    determining that the power source is providing the minimum voltage; and
    initiating a charging cycle for the electric field storage cell.

* * * * *